United States Patent
Ohta et al.

(10) Patent No.: US 10,130,975 B2
(45) Date of Patent: Nov. 20, 2018

(54) COATING FACILITY AND COATING METHOD

(71) Applicant: HONDA MOTOR CO., LTD., Tokyo (JP)

(72) Inventors: Hiroshi Ohta, Tokyo (JP); Satoshi Shimamura, Tokyo (JP); Yuji Ito, Tokyo (JP); Yasuhiro Kume, Tokyo (JP); Masaki Takahashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 14/901,460

(22) PCT Filed: Jul. 1, 2014

(86) PCT No.: PCT/JP2014/067541
§ 371 (c)(1),
(2) Date: Dec. 28, 2015

(87) PCT Pub. No.: WO2015/002195
PCT Pub. Date: Jan. 8, 2015

(65) Prior Publication Data
US 2016/0368022 A1    Dec. 22, 2016

(30) Foreign Application Priority Data
Jul. 1, 2013  (JP) ................... 2013-138246

(51) Int. Cl.
*B05D 7/00*  (2006.01)
*B05D 7/14*  (2006.01)
(Continued)

(52) U.S. Cl.
CPC .......... *B05D 7/572* (2013.01); *B05B 13/0285* (2013.01); *B05B 13/0431* (2013.01);
(Continued)

(58) Field of Classification Search
None
See application file for complete search history.

(56) References Cited

U.S. PATENT DOCUMENTS

| 5,531,833 A | 7/1996 | Ogasawara et al. |
| 2009/0117280 A1 | 5/2009 | Nakazono |

(Continued)

FOREIGN PATENT DOCUMENTS

| EP | 1284165 A2 * | 2/2003 | ............... B05D 7/14 |
| JP | H02-115078 | 4/1990 | |

(Continued)

OTHER PUBLICATIONS

English Machine Translation of JP 2006-061798, published Mar. 9, 2006, 125 pages.
Japanese Office Action dated Jan. 13, 2015, 3 pages.

*Primary Examiner* — Shamim Ahmed
*Assistant Examiner* — Bradford M Gates
(74) *Attorney, Agent, or Firm* — Rankin, Hill & Clark LLP

(57) ABSTRACT

A coating facility including: a first base outer surface coating zone; a second base inner surface coating zone; a second base outer surface coating zone; a clear inner surface coating zone and a clear outer surface coating zone; and a baking zone in which each wet coating film are simultaneously baked and cured.

2 Claims, 5 Drawing Sheets

(51) Int. Cl.
*B05B 13/02* (2006.01)
*B05B 13/04* (2006.01)
*C25D 7/00* (2006.01)
*C25D 17/00* (2006.01)
*C25D 13/12* (2006.01)
*C25D 13/22* (2006.01)
*B05B 16/20* (2018.01)
*B05B 16/60* (2018.01)
*B05B 14/462* (2018.01)
*B05B 16/00* (2018.01)
*B05D 3/02* (2006.01)

(52) U.S. Cl.
CPC ............ *B05B 14/462* (2018.02); *B05B 16/20* (2018.02); *B05B 16/60* (2018.02); *B05B 16/95* (2018.02); *B05D 7/14* (2013.01); *B05D 7/577* (2013.01); *C25D 7/00* (2013.01); *C25D 13/12* (2013.01); *C25D 13/22* (2013.01); *C25D 17/00* (2013.01); *B05B 16/00* (2018.02); *B05D 3/0209* (2013.01)

(56) References Cited

U.S. PATENT DOCUMENTS

| | | | |
|---|---|---|---|
| 2010/0136342 A1* | 6/2010 | Tachi | B05D 3/0254 428/411.1 |
| 2010/0247744 A1* | 9/2010 | Koga | B05D 7/14 427/8 |
| 2011/0318570 A1* | 12/2011 | Ryuzaki | C09D 5/36 428/324 |
| 2015/0079293 A1* | 3/2015 | Togai | C09D 175/04 427/379 |

FOREIGN PATENT DOCUMENTS

| | | |
|---|---|---|
| JP | H04-219164 | 8/1992 |
| JP | 2000-093860 | 4/2000 |
| JP | 2001-088052 | 4/2001 |
| JP | 2005-177631 | 7/2005 |
| JP | 2006-061798 | 3/2006 |
| JP | 2007-283156 | 11/2007 |

* cited by examiner

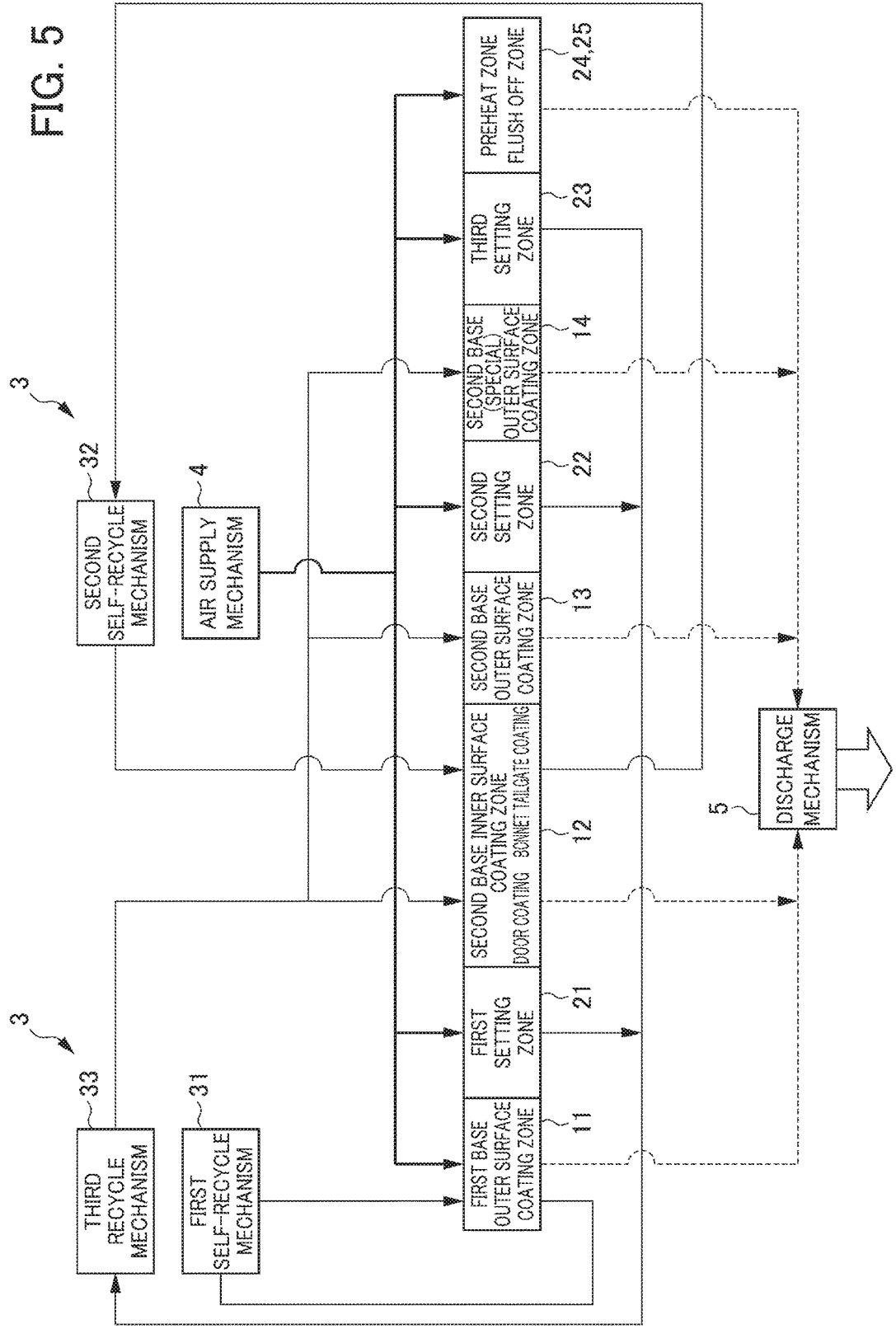

COATING FACILITY AND COATING METHOD

TECHNICAL FIELD

The present invention relates to a coating facility and a coating method. More specifically, the present invention relates to a coating facility and a coating method which are applied to a wet-on-wet coating line.

BACKGROUND ART

Conventionally, in the coating of an automobile body, midcoat coating, baking, overcoat base coating, overcoat clear coating and baking are sequentially performed on a coated product on which electrodeposition coating serving as an undercoat and baking are performed. In other words, since a total of three rounds of baking are needed, a reduction in the number of times baking is performed has been required in terms of reducing the amount of $CO_2$ discharged and saving energy.

Hence, a coating method has been proposed in which, in the coating of an automobile body, baking is not performed after midcoat coating, wet-on-wet overcoat coating is performed, and a midcoat coating film and an overcoat coating film are baked and cured simultaneously (see, for example, Patent Document 1). This coating method is a so-called 3-coat 2-bake (hereinafter referred to as "3C2B") coating method in which a total of three rounds of coating (undercoat, midcoat and overcoat) and a total of two rounds of baking are performed.

Patent Document 1: Japanese Unexamined Patent Application, Publication No. 2005-177631

DISCLOSURE OF THE INVENTION

Problems to be Solved by the Invention

However, when baking after midcoat coating is omitted, midcoat and overcoat coating need to be performed within the same booth by wet-on-wet coating. In other words, since wet coating films having different functions need to be applied and overlaid, it is difficult to control the fluidity of the interface of the coating films, with the result that, for example, mixed layers are produced to cause a skin failure of the surface of the coating film. Hence, it is necessary to obtain a satisfactory coating appearance.

The present invention is made in view of the foregoing, and an object thereof is to provide a 3C2B coating technology with which a coating film surface can be smoothed and it is possible to obtain a satisfactory coating film appearance.

Means for Solving the Problems

In order to achieve the above object, the present invention provides a coating facility (for example, a coating facility 1 which will be described later) in which a plurality of coating zones are provided along a transport direction of a coated product (for example, an automobile body W which will be described later) and in which the coated product is sequentially coated in the coating zones, the coating facility including: a first base outer surface coating zone (for example, a first base outer surface coating zone 11 which will be described later) in which an outer surface of the coated product on which electrodeposition coating is performed is coated with a first base paint; a second base inner surface coating zone (for example, a second base inner surface coating zone 12 which will be described later) which is provided downstream of the first base outer surface coating zone and in which an inner surface of the coated product coated in the first base outer surface coating zone is coated with a second base paint; a second base outer surface coating zone (for example, a second base outer surface coating zone 13 which will be described later) which is located downstream of the second base inner surface coating zone and in which the outer surface of the coated product coated in the first base outer surface coating zone is coated with the second base paint by wet-on-wet coating; a clear coating zone (for example, a clear inner surface coating zone 15 and a clear outer surface coating zone 16 which will be described later) which is provided downstream of the second base outer surface coating zone and which is coated with a clear paint by wet-on-wet coating; and a baking zone (for example, a baking zone 26 which will be described later) which is provided downstream of the clear coating zone and in which wet coating films formed with the first base paint and the second base paint are simultaneously baked and cured.

In the coating facility of the present invention, along the transport direction of the coated product, the first base outer surface coating zone, the second base inner surface coating zone, the second base outer surface coating zone, the clear coating zone and the baking zone are sequentially provided. In other words, instead of abolishing the midcoat coating and the baking after the midcoat coating, as the overcoat coating, the first base coating, the second base coating and the clear coating are performed by wet-on-wet coating, and these coating films are simultaneously baked and cured.

In the present invention, the overcoat base coating film is formed with two layers, that is, the first base coating film and the second base coating film. A ray blocking function and a base hiding function included in the midcoat coating film are incorporated into the first base coating film and thus it is possible to abolish the midcoat coating and the baking after the midcoat coating, with the result that it is possible to provide a 3C2B coating technology which can reduce the amount of $CO_2$ discharged and which can save energy.

In the present invention, the second base inner surface coating zone is provided between the first base outer surface coating zone and the second base outer surface coating zone, and thus it is possible to sufficiently acquire an interval from the first base outer surface coating to the second base outer surface coating. In this way, it is possible to sufficiently acquire still placement time of the first base wet coating film, and it is possible to apply the second base paint after the surface of the first base wet coating film is made to sufficiently flow and be smooth. Hence, in the present invention, the surface of the coating film can be smoothed, and thus it is possible to obtain a satisfactory coating film appearance.

Preferably, among intervals between a plurality of the coating zones, a setting zone (for example, a first setting zone 21, a second setting zone 22 and a third setting zone 23 which will be described later) is further included in at least one or more of the intervals between the coating zones.

In the present invention, among the intervals between a plurality of coating zones, the setting zone is further provided in at least one or more of the intervals between the coating zones.

In the present invention, since the setting zone is provided in at least one or more of the intervals between the coating zones, it is possible to sufficiently acquire still placement time of the wet coating film, and it is possible to make the surface of the wet coating film flow more sufficiently. Hence, in the present invention, the surface of the coating film can be smoothed, and thus it is possible to obtain a more satisfactory coating film appearance.

Preferably, the coated product is an automobile body, and the second base inner surface coating zone is formed with a door coating zone (for example, a door coating zone 15A which will be described later) and a hood coating zone (for example, a bonnet tailgate coating zone 15B which will be described later).

In the present invention, in the coating of the automobile body, the second base inner surface coating zone is formed with the door coating zone and the hood coating zone, and thus it is possible to acquire still placement time of the first base wet coating film for the second base outer surface coating by wet-on-wet coating.

Preferably, the setting zone is a zone in which, as necessary, coating can be performed manually.

In the present invention, the setting zone is a zone in which, as necessary, coating can be performed manually.

In the present invention, for example, even when a failure occurs in a coating machine such as malfunction of a coating robot provided within a coating zone, and thus it is difficult to perform coating, the coating can be completed complementarily and manually in the setting zone provided on the downstream side. In other words, in the present invention, it is possible to acquire a space that copes with a failure in a coating machine and it is possible to perform more efficient coating.

Preferably, an air supply mechanism (for example, an air supply mechanism 4 which will be described later) which air-conditions and supplies fresh air to the setting zone, and a recycle mechanism (for example, a recycle mechanism 3 which will be described later) which recycles the air-conditioned air discharged from each of the zones to the coating zone are further included.

In the present invention, fresh air is air-conditioned and supplied to the setting zone and the air-conditioned air discharged from each zone is recycled in the coating zone.

In the present invention, fresh air is air-conditioned and supplied to the setting zone where coating is likely to be performed manually, and thus it is possible to enhance an operation environment. Since fresh air whose temperature and humidity have been appropriately adjusted is supplied, a solvent in the wet coating film is volatilized efficiently in the setting zone, and the flow of the surface of the wet coating film can be facilitated. Hence, the surface of the coating film can be further smoothed, and thus it is possible to obtain a more satisfactory coating film appearance. Furthermore, since the air-conditioned air discharged from each zone is recycled to the coating zone, it is possible to reduce power necessary for air conditioning.

There is provided a coating method of sequentially coating a coated product in a plurality of coating steps while transporting the coated product, the coating method including: a first base outer surface coating step of coating, with a first base paint, an outer surface of the coated product on which electrodeposition coating is performed; a second base inner surface coating step of coating, with a second base paint, an inner surface of the coated product subjected to the first base outer surface coating step; a second base outer surface coating step of coating, with the second base paint by wet-on-wet coating, the outer surface of the coated product subjected to the first base outer surface coating step; a clear coating step of coating, with a clear paint by wet-on-wet coating, the coated product subjected to the second base outer surface coating step; and a baking step of simultaneously baking and curing wet coating films formed with the first base paint and the second base paint in the coated product subjected to the clear coating step.

Preferably, among intervals between a plurality of the coating steps, a setting step is further included in at least one or more of the intervals between the coating steps.

Preferably, the coated product is an automobile body, and the second base inner surface coating step is formed with a door coating step and a hood coating step.

Preferably, the setting step is a step in which, as necessary, coating can be performed manually.

Preferably, fresh air is air-conditioned and supplied in the setting step, and the air-conditioned air discharged from each of the steps is recycled and supplied in the coating step.

In the invention of the coating method described above, the same effects as those of the invention of the coating facility described above are obtained.

Effects of the Invention

In the present invention, it is possible to establish 3C2B coating with which a coating film surface can be smoothed and it is possible to obtain a satisfactory coating film appearance.

BRIEF DESCRIPTION OF THE DRAWINGS

FIG. 5 is a diagram showing a supply path of air in the coating facility according to the embodiment.

PREFERRED MODE FOR CARRYING OUT THE INVENTION

An embodiment of the present invention will be described in detail below with reference to the drawings.

Figure 1:
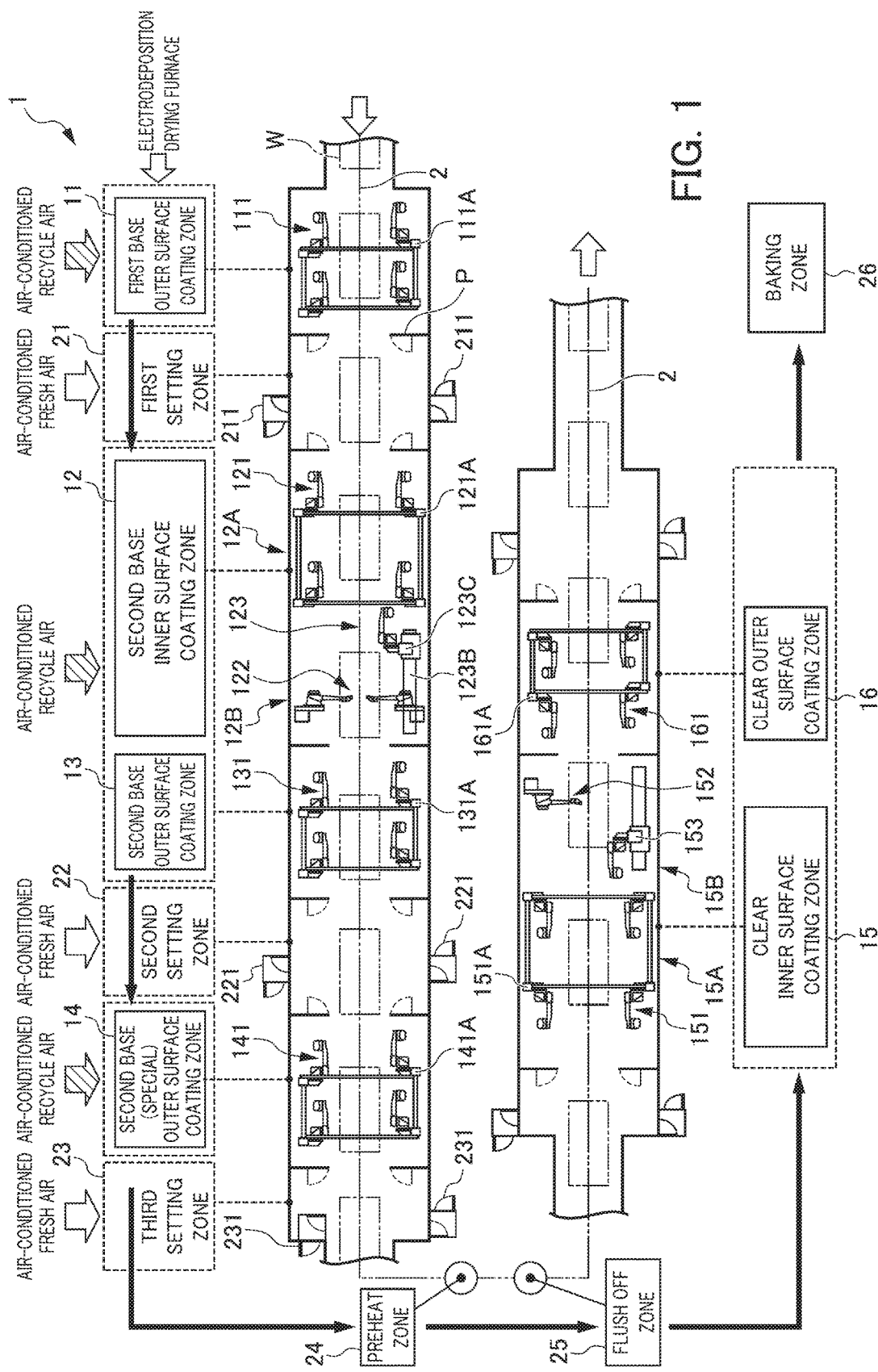
FIG. 1 is a plan view of a coating facility according to an embodiment of the present invention.
Figure 2:
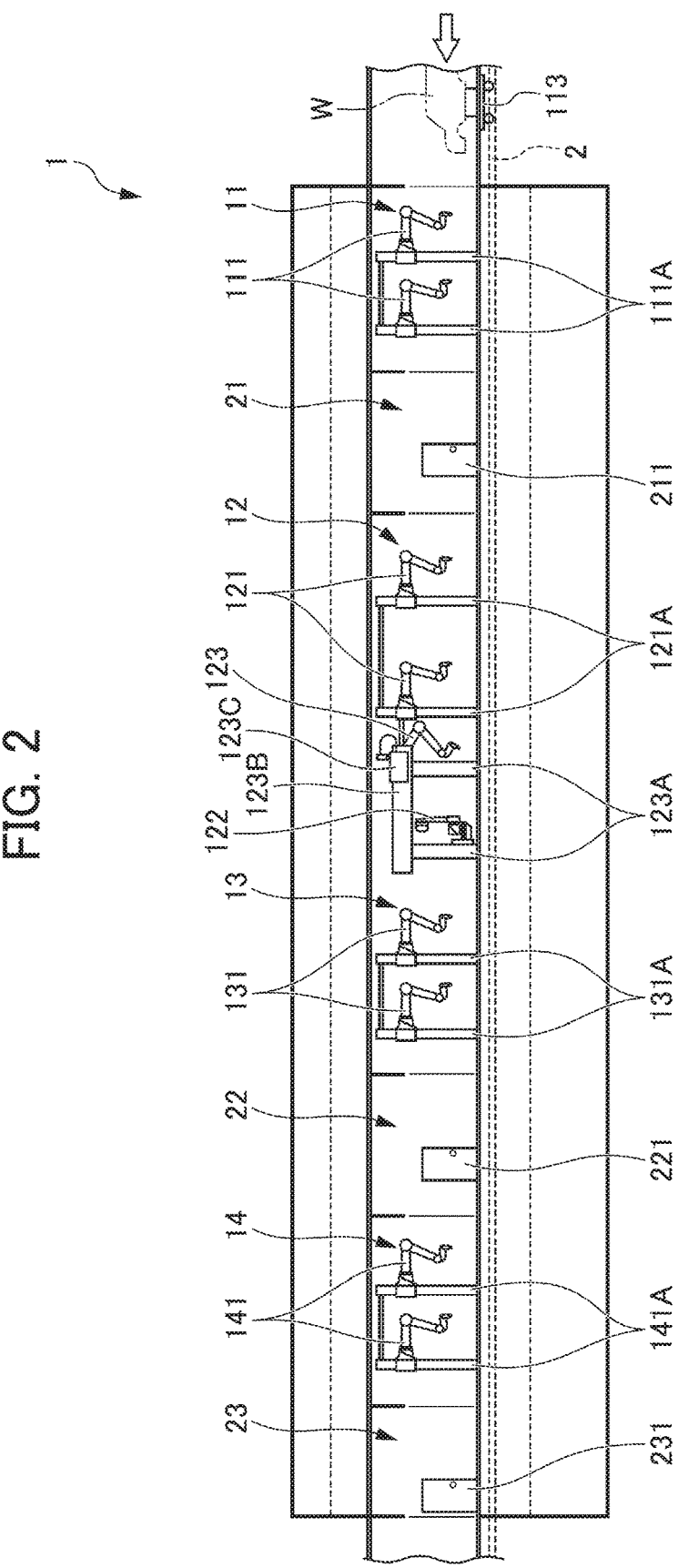
FIG. 2 is a side cross-sectional view of the coating facility according to the embodiment.

FIG. 1 is a plan view of a coating facility 1 according to an embodiment of the present invention. FIG. 2 is a side cross-sectional view of the coating facility 1 according to the present embodiment. The coating facility 1 according to the present embodiment is a coating facility for forming a multilayer coating film on a coated product. More specifically, as shown in FIG. 1, the coating facility 1 has a plurality of coating zones provided along the transport direction of the coated product, and in these coating zones, the coated product is sequentially coated.

As shown in FIGS. 1 and 2, the coated product W is mounted on a transport carriage 113 moved on a transport line 2, and is transported into the coating facility 1. The transport line 2 of the coating facility 1 is formed, in plan view, in a U-turn structure. Specifically, the coated product is linearly transported by the transport carriage 113, is then turned in the shape of the letter U and linearly transported again.

As the coated product W, for example, an automobile body W is preferably used. More specifically, an automobile body W on which electrodeposition coating (for example, cation electrodeposition coating) is performed is preferably used. A description will be given below using, as an example, a case where an automobile body W on which electrodeposition coating is performed is used as the coated product W.

As shown in FIG. 1, the coating facility 1 includes a first base outer surface coating zone 11, a first setting zone 21, a second base inner surface coating zone 12, a second base outer surface coating zone 13, a second setting zone 22, a second base (special) outer surface coating zone 14, a third setting zone 23, a preheat zone 24, a flush off zone 25, a clear inner surface coating zone 15, a clear outer surface coating zone 16 and a baking zone 26.

The coating facility 1 also includes an air supply mechanism (not shown) which supplies air-conditioned fresh air to each of the setting zones and a recycle mechanism (not shown) which recycles and supplies the air discharged from each zone.

Each zone will be described in detail below. However, a coating robot, an opener robot, the air supply mechanism and the recycle mechanism will be collectively described in detail later.

The first base outer surface coating zone 11 is provided downstream of an electrodeposition drying furnace where an electrodeposition coating film is baked. In the first base outer surface coating zone 11, a plurality of (for example, as shown in FIG. 1, four) coating robots 111 provided within the zone coat the outer surface of the automobile body W on which electrodeposition coating is performed with a first base paint.

The air recycled by the recycle mechanism is supplied to the first base outer surface coating zone 11. In this way, power necessary for air conditioning is reduced.

Here, the first base paint used in the first base outer surface coating zone 11 will be described in detail.

As the first base paint, a water-soluble or water-dispersible paint, such as an emulsion, containing a resin component and a pigment component can be used.

As the resin component, a component which contains a polyester resin, an acrylic resin, a urethane resin or the like as a main component is used.

As the pigment component, a generic coloring pigment and an extender pigment are used.

Examples of the coloring pigment can include a white pigment such as titanium oxide, a black pigment such as carbon black, a yellow pigment such as ocher, a red pigment such as red iron oxide or anthraquinone, a blue pigment such as phthalocyanine blue and a green pigment such as phthalocyanine green.

Examples of the extender pigment can include inorganic pigments such as barium sulfate, calcium carbonate, kaolin and silicate (talc).

The first base paint may contain, as necessary, an organic solvent or various types of additives.

In the first base outer surface coating zone 11, the first base paint in which the pigment concentration of a first base coating film after being baked and cured is 40 to 60 mass % is preferably used.

The lower limit value of the pigment concentration of the first base coating film after being baked and cured is set at 40 mass %, and thus it is possible to reliably block high brightness color rays to sufficiently reduce degradation and separation at an interface with the electrodeposition coating film and to acquire excellent chipping resistance. The upper limit value is set at 60 mass %, and thus it is possible to stabilize the dispersion of the pigment to reduce color unevenness and to reduce breaking of the coating film, with the result that it is possible to obtain an excellent finish appearance and coating film performance.

In the first base outer surface coating zone 11, the first base coating film is preferably formed by applying the first base paint such that the thickness of the first base coating film after being baked and cured is 20 µm or more.

By setting the lower limit value of the thickness of the first base coating film after being baked and cured at 20 µm, it is possible to reliably block high brightness color rays to sufficiently reduce degradation and separation at the interface with the electrodeposition coating film. In terms of preventing the lowering of finish appearance caused by running of the paint after coating, the upper limit value of the film thickness is preferably 40 µm.

In the first base outer surface coating zone 11, a first base paint whose curing temperature is lower than the curing temperature of a second base paint, which will be described later, is preferably used. In other words, when the first base coating film and the second base coating film are baked and cured simultaneously, a setting is preferably made such that the first base coating film is cured before the second base coating film.

Conventionally, at the time of simultaneous baking, when the curing of the second base coating film is started before the curing of the first base coating film, the second base coating film in which curing has already started is distorted by curing shrinkage of the first base coating film, with the result that the smoothness of the multilayer coating film is disadvantageously degraded. By contrast, in the present embodiment, at the time of simultaneous baking, since the curing of the second base coating film is started after the curing of the first base coating film is started, the above problem is avoided and thus it is possible to enhance the smoothness of the multilayer coating and to enhance glossiness, which is an appearance property.

Here, the "curing temperature" means a temperature at a time when the lowering of viscosity is stopped while temperature is being increased and the temperature is then increased. Specifically, it is measured with a dynamic viscoelasticity measuring device.

The first setting zone 21 is provided downstream of the first base outer surface coating zone 11. In the first setting zone 21, the automobile body W is still placed on the transport carriage 113, and thus a still placement time of a first base wet coating film formed in the first base outer surface coating zone 11 is acquired. In this way, the surface of the first base wet coating film sufficiently flows, and the surface of the first base wet coating film is smoothed.

The first setting zone 21 is utilized as a site for verifying the quality of the first base wet coating film, and is also a zone where coating can be performed manually as necessary. More specifically, when a failure or the like occurs in the coating robot 111 in the first base outer surface coating zone 11 located upstream, an operator enters the first setting zone 21 through a door 211, and the first base paint is applied manually by the operator.

The air-conditioned fresh air which is taken in from outside air is supplied to the first setting zone 21 by the air supply mechanism. In this way, it is possible to enhance the operation environment when manual coating is performed. Since the supplied fresh air has had its temperature and humidity appropriately adjusted, a solvent in the wet coating film is volatilized stably and efficiently, and flow of the surface of the wet coating film is stably facilitated.

The second base inner surface coating zone 12 is provided downstream of the first setting zone 21. In the second base inner surface coating zone 12, the second base paint is applied to the inner surface of the automobile body W by a plurality of (for example, as shown in FIG. 1, six) coating robots 121 and 122 provided within the zone.

More specifically, the second base inner surface coating zone 12 is formed with a door coating zone 12A provided on the upstream side and a bonnet tailgate coating zone 12B provided on the downstream side.

In the door coating zone 12A, four coating robots 121 are provided. In the door coating zone 12A, the second base paint is applied by these four coating robots 121 to the inner surface of the door.

In the bonnet tailgate coating zone 12B, two coating robots 122 and an opener robot 123 which opens and closes the bonnet hood and the trunk hood of the automobile body W are provided. In the bonnet tailgate coating zone 12B, the bonnet hood and the trunk hood are opened by the opener robot 123, and in this state, the second base paint is applied to the inner surface of the bonnet and the trunk by the two coating robots 122. After the application of the second base paint, the bonnet hood and the trunk hood are closed by the opener robot 123.

The second base outer surface coating zone 13 is provided downstream of the second base inner surface coating zone 12. More specifically, the second base outer surface coating zone 13 is a zone in which the second base paint is applied by wet-on-wet coating to the outer surface of the coating film applied in the first base outer surface coating zone 11. In the second base outer surface coating zone 13, a plurality of (for example, as shown in FIG. 1, four) coating robots 131 provided within the zone coat the outer surface of the automobile body W with the second base paint by wet-on-wet coating.

Here, "wet-on-wet coating" in the present specification means that the coating films are applied and overlaid without being baked and cured normally at 140 to 170° C. Hence, a case where preheating and flush off are performed on wet coating films and thereafter they are applied and overlaid is also included in the scope of "wet-on-wet coating".

The air recycled by the recycle mechanism is supplied to the second base inner surface coating zone 12 and the second base outer surface coating zone 13 which are provided continuously. In this way, the power necessary for air conditioning is reduced.

Here, the second base paint used in the second base inner surface coating zone 12 and the second base outer surface coating zone 13 will be described in detail.

As the second base paint, as with the first base paint, a water-soluble or water-dispersible paint, such as an emulsion, containing a resin component and a pigment component can be used.

As the resin component, as with the first base coating film, a component which contains a polyester resin, an acrylic resin, a urethane resin or the like as a main component is used. However, it is not necessary to use the same resin as that in the first base coating film.

As the pigment component, as with the first base coating film, the various types of coloring pigments and extender pigments described above are used. Since the second base coating film plays a role in the expression of hue, not only the coloring pigment described above but also a bright pigment can be used.

Examples of the bright pigment can include pigments that are generally mixed with an automotive external plate paint, such as aluminum flake, mica, mica flake and glass flake.

The second base paint may contain, as necessary, an organic solvent or various types of additives.

In the second base inner surface coating zone 12 and the second base outer surface coating zone 13, the second base coating film is formed by applying the second base paint such that the thickness of the second base coating film after being baked and cured is 8 μm or more.

The lower limit value of the thickness of the second base coating film after being baked and cured is set at 8 μm, and thus it is possible to enhance corrosion resistance after chipping. In terms of preventing lowering of the finish appearance caused by running of the paint after coating, the upper limit value of the film thickness is preferably 25 μm.

In the present embodiment, a combination in which, at the curing temperature of the second base paint, a clear paint which will be described later has lower coating film viscosity than the second base paint is preferably used.

In the present embodiment, it is possible to reduce mixed layers between the second base coating film and the clear coating film because the clear coating film has lower viscosity than the second base coating film at the curing temperature of the second base paint. It is also possible to release a stress (curing distortion) in a coating film shrinkage direction caused when the second base coating film is cured and shrunk, and thus it is possible to reduce the occurrence of leaving curing distortion in the coating film. In this way, it is possible to enhance glossiness, which is an appearance property, and it is also possible to reduce the occurrence of separation caused by release of the curing distortion left in the coating film at the same time as when stress such as chipping is input from the outside.

The second setting zone 22 is provided downstream of the second base outer surface coating zone 13. In the second setting zone 22, the automobile body W is still placed on the transport carriage 113, and thus still placement time of a second base wet coating film formed in the second base outer surface coating zone 13 is acquired. In this way, the surface of the second base wet coating film sufficiently flows, and the surface of the second base wet coating film is smoothed.

The second setting zone 22 is utilized as a site for verifying the quality of the second base wet coating film, and is also a zone where coating can be performed manually as necessary. More specifically, when a failure or the like occurs in the coating robot 131 in the second base outer surface coating zone 13 located upstream, the operator enters the second setting zone 22 through a door 221, and the second base paint is applied manually by the operator.

The air-conditioned fresh air which is taken in from outside air is supplied, as in the first setting zone 21, to the second setting zone 22 by the air supply mechanism.

The second base (special) outer surface coating zone 14 is provided downstream of the second setting zone 22. In the second base (special) outer surface coating zone 14, a plurality of (for example, as shown in FIG. 1, four) coating robots 141 provided within the zone coat the outer surface of the automobile body W with a second base special paint contained in the second base paint by wet-on-wet coating.

The air recycled by the recycle mechanism is supplied to the second base (special) outer surface coating zone 14. In this way, power necessary for air conditioning is reduced.

The second base (special) outer surface coating zone 14 is provided in order to perform special coating such as when a metallic paint finish or a pearl paint finish is performed, and is utilized as a setting zone in a normal coating finish.

The third setting zone 23 is provided downstream of the second base (special) outer surface coating zone 14. In the third setting zone 23, the automobile body W is still placed on the transport carriage 113, and thus still placement time of a second base special wet coating film formed in the second base (special) outer surface coating zone 14 is acquired. In this way, the surface of the second base special wet coating film sufficiently flows, and the surface of the second base special wet coating film is smoothed.

The third setting zone 23 is utilized as a site for verifying the quality of the second base special wet coating film, and is also a zone where coating can be performed manually as necessary. More specifically, when a failure or the like occurs in the coating robot 141 in the second base (special) outer surface coating zone 14 located upstream, the operator enters the third setting zone 23 through a door 231, and the second base special paint is applied manually by the operator.

The air-conditioned fresh air which is taken in from outside air is supplied, as in the first setting zone 21 and the second setting zone 22, to the third setting zone 23 by the air supply mechanism.

The preheat zone 24 is provided downstream of the third setting zone 23. In the preheat zone 24, the wet coating film formed in each of the coating zones described above is preheated to a predetermined temperature.

The preheat conditions (temperature and time) are set, as necessary, according to the types of the first base paint and the second base paint (second base special paint).

The flush off zone 25 is provided downstream of the preheat zone 24. In the flush off zone 25, the automobile body W is still placed on the transport carriage 113 transported along the transport line 2, and thus most of the volatile components such as a solvent contained in the wet coating film preheated in the preheat zone 24 are removed.

The clear inner surface coating zone 15 is provided downstream of the flush off zone 25. In the clear inner surface coating zone 15, a plurality of (for example, as shown in FIG. 1, five) coating robots 151 and 152 provided within the zone coat the inner surface of the automobile body W with a clear paint by wet-on-wet coating.

More specifically, the clear inner surface coating zone 15 is formed with a door coating zone 15A provided on the upstream side and a bonnet tailgate coating zone 15B provided on the downstream side.

In the door coating zone 15A, four coating robots 151 are provided. In the door coating zone 15A, the clear paint is applied by these four coating robots 151 to the inner surface of the door by wet-on-wet coating.

In the bonnet tailgate coating zone 15B, one coating robot 152 and an opener robot 153 which opens and closes the bonnet hood and the trunk hood are provided. In the bonnet tailgate coating zone 15B, the bonnet hood and the trunk hood are opened by the opener robot 153, and in this state, the clear paint is applied to the inner surface of the bonnet and the trunk hood by wet-on-wet coating by the one coating robot 152. After the application of the clear paint, the bonnet hood and the trunk hood are closed by the opener robot 153.

The clear outer surface coating zone 16 is provided downstream of the clear inner surface coating zone 15. More specifically, the clear outer surface coating zone 16 is not partitioned from the clear inner surface coating zone 15, and is continuously provided to the clear inner surface coating zone 15. In the clear outer surface coating zone 16, a plurality of (for example, as shown in FIG. 1, four) coating robots 161 provided within the zone coat the outer surface of the automobile body W with the clear paint by wet-on-wet coating.

Here, the clear paint used in the clear inner surface coating zone 15 and the clear outer surface coating zone 16 will be described in detail.

As the clear paint, a water-based paint for a generic automotive exterior can be used. Examples of the curing mechanism can include acrylic-melamine curing, carboxylic acid-glycidyl curing and hydroxyl group-(block) isocyanate curing.

As the clear paint, either one-liquid or two-liquid mixing paint can be used. Since one-liquid paint is inexpensive, and there are no restrictions such as pot life, one-liquid paint is preferable in terms of easy handling in an automobile coating line.

The clear paint may contain, as necessary, an organic solvent or various types of additives.

In the clear inner surface coating zone 15 and the clear outer surface coating zone 16, as described above, the clear paint which has lower viscosity than the second base paint at the curing temperature of the second base paint is preferably used. In other words, a setting is preferably made such that when the second base coating film and the clear coating film are baked and cured simultaneously, the viscosity of the clear paint is lower than that of the second base paint.

The baking zone 26 is provided downstream of the clear outer surface coating zone 16. In the baking zone 26, the wet coating films formed on the outer surface and the inner surface of the automobile body W in the coating zones described above are baked and cured simultaneously. In this way, power necessary for baking is significantly reduced.

The baking conditions (temperature and time) are set, as necessary, according to the types of the first base paint, the second base paint (second base special paint) and the clear paint.

The configurations of the individual zones described above will next be described in further detail.

As shown in FIG. 2, except for between the second base inner surface coating zone 12 and the second base outer surface coating zone 13 and between the clear inner surface coating zone 15 and the clear outer surface coating zone 16, the zones are formed with a booth partitioned with a wall. However, in the wall partitioning each zone, an opening large enough to pass the automobile body W transported from the transport carriage 113 is formed.

A plurality of coating robots 111, 121, 131 and 141 provided in the coating zones are individually formed with the same wall-mounted coating robot. As shown in FIGS. 1 and 2, on both side walls of the coating zones extending along the transport line, columns 111A, 121A, 131A and 141A extending in a vertical direction are provided two by two. Columns opposite each other in a width direction are coupled to each other at the upper portions thereof and columns adjacent to each other in the transport direction are coupled to each other at the upper portions thereof. The wall-mounted coating robots 111, 121, 131 and 141 are attached to the upper portions of the columns 111A, 121A, 131A and 141A, respectively.

The automobile body W is coated by these wall-mounted coating robots 111, 121, 131 and 141, and the door of the automobile body W is also opened and closed by these wall-mounted coating robots 111, 121, 131 and 141. The coating robots 151 and 161 provided within the clear inner surface coating zone 15 and the clear outer surface coating zone 16 are also formed with the same wall-mounted coating robot as described above.

In the wall-mounted coating robot described above, as compared with a conventional shift base-type coating robot capable of sliding in the transport direction, since it is not necessary to provide a shift base serving as a base stage installed on a floor surface, it is possible to reduce the space required in a direction perpendicularly intersecting the proceeding direction of the transport line 2 of each coating zone and to decrease the width of the booth. Since the width of the booth can be decreased, and thus the volume of the booth can be reduced, the amount of air recycled to each booth can be reduced and therefore power necessary for air conditioning can be reduced, with the result that it is possible to reduce the amount of $CO_2$ discharged.

In the wall-mounted coating robot described above, as compared with the conventional shift base-type coating robot, since it is not necessary to provide a shift base and an arm is provided to extend from further above, it is possible to prevent interference with, for example, the door of the automobile body W to significantly enlarge the range of operation, with the result that it is possible to perform more efficient coating.

Figure 4:
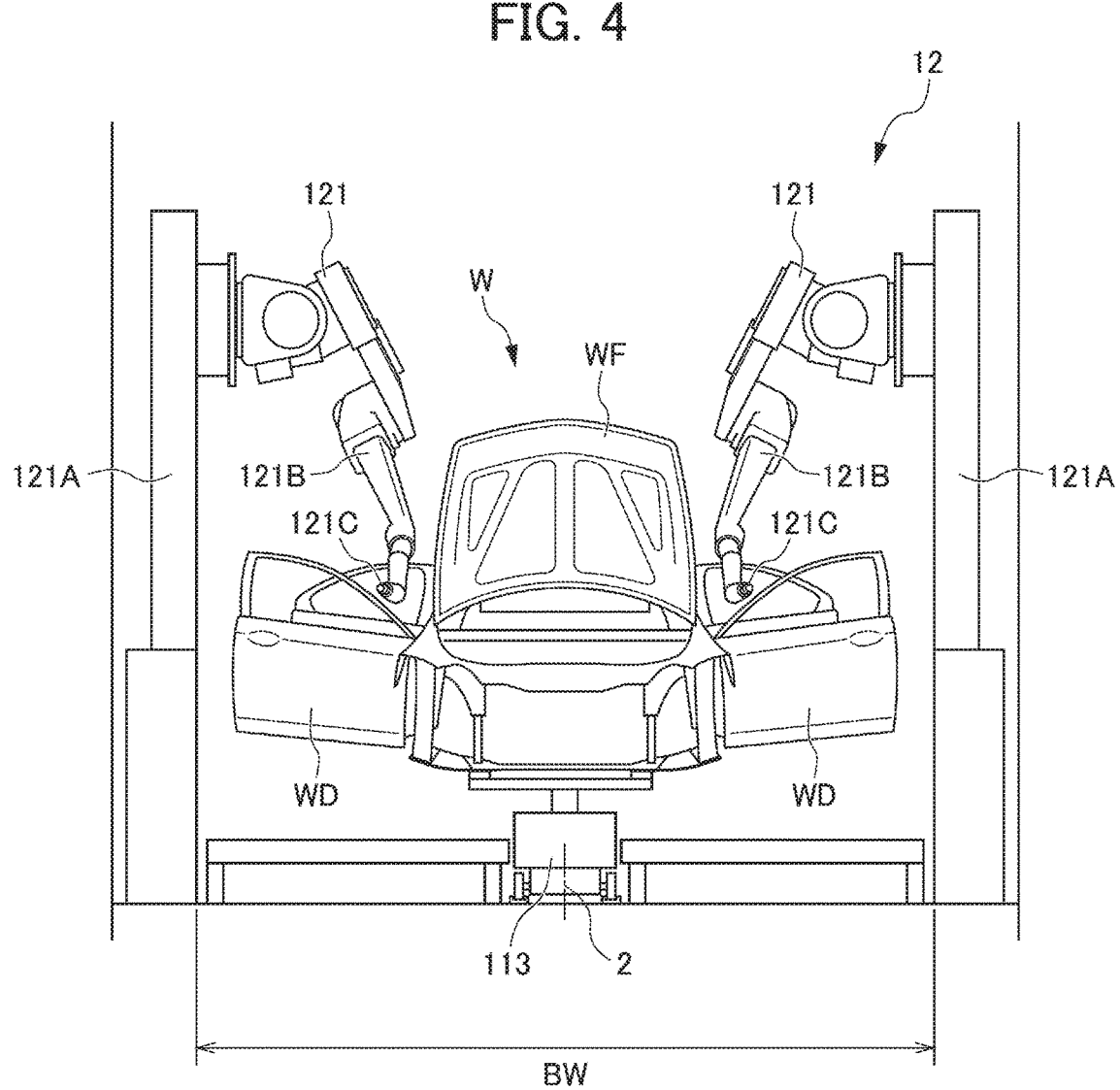
FIG. 4 is a cross-sectional view of a second base inner surface coating zone according to the embodiment.

Here, FIG. 4 is a cross-sectional view of the second base inner surface coating zone. More specifically, FIG. 4 is a diagram showing the second base inner surface coating zone 12 when seen from the front surface in the proceeding direction of the transport line 2, and shows a state where the bonnet hood WF and the door WD of the automobile body W are opened. As shown in FIG. 4, when the door WD of the automobile body W is opened in particular, interface with the base stage of the coating robots 121 and 121 and the like does not occur, with the result that it is possible to decrease the booth width BW accordingly.

By decreasing the booth width BW, it is possible to reduce the amount of air supplied into the second base inner surface coating zone 12, and it is possible to reduce power and the like necessary for air conditioning in which the temperature and the humidity for enhancing the quality of the coating are managed, with the result that it is possible to save energy, enhance quality, and reduce the amount of $CO_2$ discharged.

The door coating zone 12A is provided on the upstream side of the second base inner surface coating zone 12, the bonnet tailgate coating zone 12B is provided on the downstream side thereof and these two booths are collectively circulated by a second self-recycle mechanism 32, with the result that it is possible to further save energy.

With reference back to FIGS. 1 and 2, on one side wall of the second base inner surface coating zone 12, two columns 123A extending in the vertical direction and a horizontal support portion 123B which extends horizontally and which couples the upper portions of these two columns 123A are provided. In the horizontal support portion 123B, a slide mechanism 123C is provided which allows the opener robot 123 to slide in the horizontal direction, that is, in the transport direction.

The slide mechanism as described above is also provided in the opener robot 153 provided in the clear inner surface coating zone 15.

As shown in FIG. 2, in the side walls of the setting zones, the doors 211, 221 and 231 are provided. Except for the part through which the automobile body W on the transport line 2 is passed, a partition wall P is provided between the booths where a door for maintenance and inspection is provided as necessary. In this way, when a failure or the like occurs in the coating robot, the operator can enter the booth.

The configuration of each coating zone will next be described in further detail.

Figure 3:
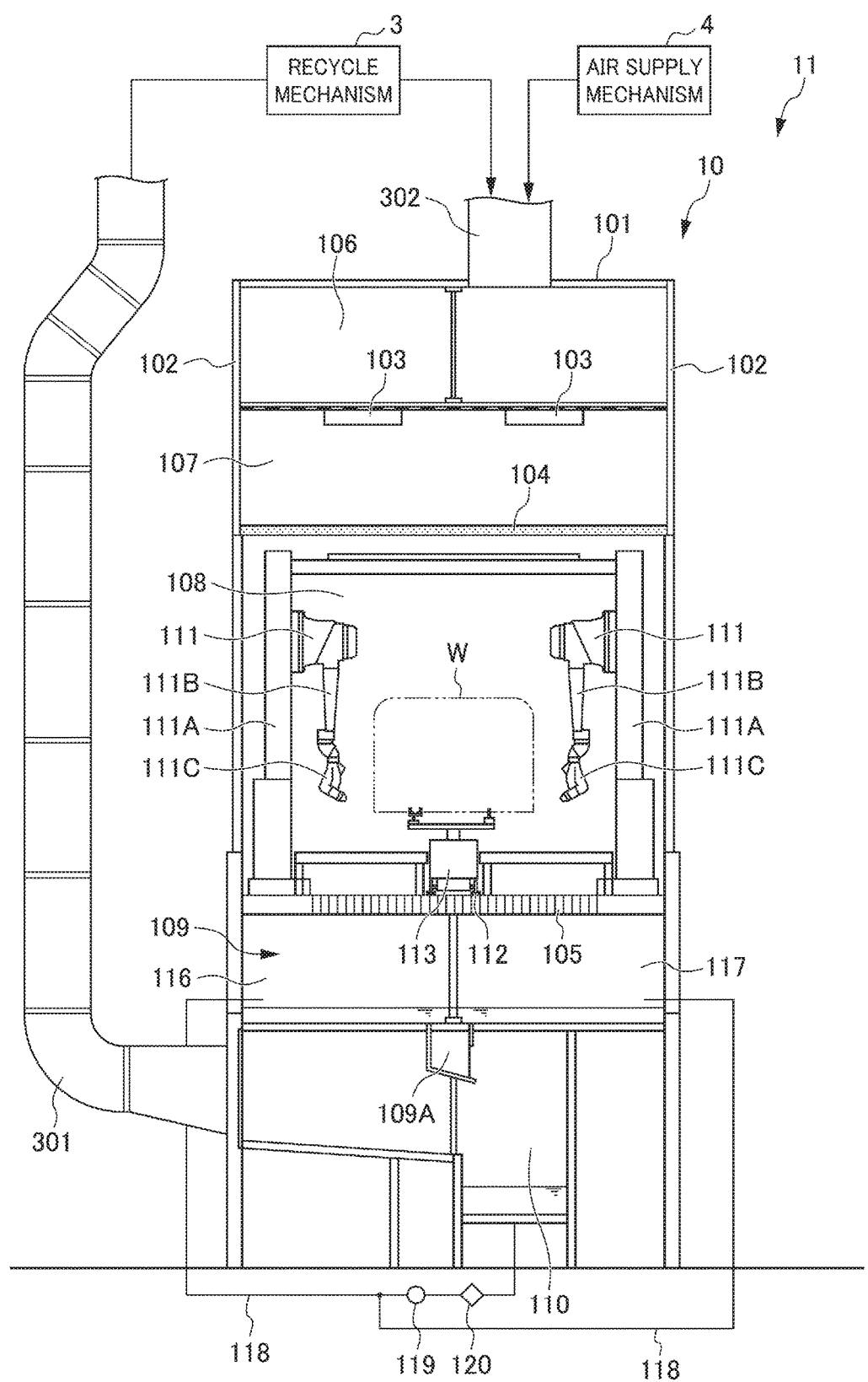
FIG. 3 is a cross-sectional view of the coating facility according to the embodiment.

FIG. 3 is a cross-sectional view of the coating facility 1. More specifically, FIG. 3 is a cross-sectional view, in the width direction, of a coating robot installation part of a coating booth 10 of the first base outer surface coating zone 11 shown in FIG. 1. As shown in FIG. 3, the coating booth 10 is a wet-type coating booth. The coating booth 10 is formed in the shape of a tunnel extending in the transport direction by an upper wall 101 and side walls 102. The interior of the coating booth 10 is partitioned into four upper and lower chambers by a bug filter 103, a filter 104 and a drain board 105 provided in the partition walls. These four chambers form, sequentially from above, a dynamic pressure chamber 106, a static pressure chamber 107, a coating chamber 108 and a collection chamber 109. In a lower center portion of the collection chamber 109, a water storage tank 110 is provided.

In a center portion of the drain board 105 within the coating chamber 108, a transport conveyor 112 is provided. The transport carriage 113 which supports and transports the automobile body W serving as the coated product W is engaged with the transport conveyor 112. On both sides of the transport conveyor 112, the wall-mounted coating robots 111 which coat the automobile body W transported by the transport carriage 113 are installed. In each of the wall-mounted coating robots 111 attached to the columns 111A, a spray gun 111C is supported to the tip end of an arm 111B. In this way, the coating robot 111 drives the arm 111B to move the spray gun 111C to a desired position, and thereafter performs the coating.

Within the collection chamber 109, two overflow tanks 116 and 117 are formed. Water overflowing from the overflow tanks 116 and 117 is collected, as collected water, through a venturi portion 109A into the water storage tank 110.

The bottom portion of the water storage tank 110 where the collected water is stored and the two overflow tanks 116 and 117 are connected through a water supply pipe 118 to a water supply pump 119 and a filter 120. In this way, the collected water stored in the water storage tank 110 is made to flow back to the two overflow tanks 116 and 117 by the water supply pump 119.

In the coating booth 10, an air supply mechanism 4 is provided. The air supply mechanism 4 is connected through a supply duct 302 to the dynamic pressure chamber 106 of the coating booth 10. In this way, the fresh air which is taken in from outside air and which is air-conditioned is supplied into the dynamic pressure chamber 106 of the coating booth 10. The fresh air is air-conditioned such, that for example, the temperature within the coating booth 10 is a booth temperature of $25\pm3°$ C. and the humidity is 65 to 75%.

The fresh air supplied into the dynamic pressure chamber 106 is passed through the bug filter 103, and is thereby rectified by a downward smooth air current and is introduced into the static pressure chamber 107. Then, the fresh air is passed through the filter 104 to become a clean air current with refuse thereof removed and is introduced into the coating chamber 108. Then, the air containing a paint mist is passed through the drain board 105 and is introduced into the collection chamber 109.

In the coating booth 10, a recycle mechanism 3 is provided. The recycle mechanism 3 is connected through a discharge duct 301 to the collection chamber 109 of the coating booth 10. The recycle mechanism 3 is also connected through the supply duct 302 to the dynamic pressure chamber 106 of the coating booth 10. In this way, the air discharged from the collection chamber 109 through the discharge duct 301 is collected by the recycle mechanism 3 and is again supplied through the supply duct 302 into the dynamic pressure chamber 106. In other words, the fresh air supplied by the air supply mechanism 4 and the recycled air supplied by the recycle mechanism 3 are introduced into the coating booth 10 and are mixed.

The configuration of the coating booths in the coating zones 12, 13 and 14 is basically the same as that of the coating booth 10 described above. However, in the coating zones 12, 13 and 14, as will be described later, the air supply mechanism 4 for supplying fresh air is not connected, and only the recycle mechanism 3 is connected. In other words, in the coating zones 12, 13 and 14, fresh air is not supplied, and only the air recycled by the recycle mechanism 3 is supplied.

The supply of air in the coating facility 1 will next be described in further detail.

FIG. 5 is a diagram showing the supply path of air in the coating facility 1. More specifically, FIG. 5 is a diagram showing the supply path of air in each zone for base coating (first base coating and second base coating). As shown in FIG. 5, the recycle mechanism 3 included in the coating facility 1 is configured to include a first self-recycle mechanism 31, a second self-recycle mechanism 32 and a third recycle mechanism 33. These recycle mechanisms are configured to include a pump and a drive device for driving and controlling the pump (none of which are shown).

Here, a self-recycle mechanism means a mechanism which collects and recycles the air discharged from the coating booth and supplies it again to the same coating booth. When it is necessary to adjust the amount of air due to clogging of the filter or the like, the self-recycle mechanism has the advantage that its maintenance is easy to perform.

The air supply mechanism 4 included in the coating facility 1 is configured to include a blower, an air-conditioning device and a drive device for driving and controlling these two components (none of which are not).

The first self-recycle mechanism 31 is connected to the discharge duct and the supply duct of the first base outer surface coating zone 11. In this way, the first self-recycle mechanism 31 collects and recycles part of the air discharged from the first base outer surface coating zone 11, and supplies it again to the first base outer surface coating zone 11.

However, the air supply mechanism 4 is also connected to the supply duct of the first base outer surface coating zone 11, and the fresh air supplied by the air supply mechanism 4 and the fresh air supplied by the first self-recycle mechanism 31 are mixed before being introduced into the first base outer surface coating zone 11. In this way, an increase in the concentration of volatile components within the coating booth 10 is reduced. As described above, the part of the air discharged from the first base outer surface coating zone 11 is recycled by the first self-recycle mechanism 31, whereas the remaining air is discharged by a discharge mechanism 5 which is configured to include a discharge port (not shown).

The second self-recycle mechanism 32 is connected to the discharge duct and the supply duct of the second base inner surface coating zone 12. In this way, the second self-recycle mechanism 32 collects and recycles part of the air discharged from the second base inner surface coating zone 12, and supplies it again into the second base inner surface coating zone 12.

However, the third recycle mechanism 33, which will be described later, is also connected to the second base inner surface coating zone 12, and the air recycled by the third recycle mechanism 33 and the air recycled by the second self-recycle mechanism 32 are mixed before being introduced into the second base inner surface coating zone 12. In this way, an increase in the concentration of volatile components within the coating booth of the second base inner surface coating zone 12 is reduced. As described above, the part of the air discharged from the second base inner surface coating zone 12 is recycled by the second self-recycle mechanism 32, whereas the remaining air is discharged by the discharge mechanism 5 which is configured to include the discharge port (not shown).

The third recycle mechanism 33 is connected to the discharge duct of each setting zone, and is also connected to the supply ducts of the second base inner surface coating zone 12, the second base outer surface coating zone 13 and the second base (special) outer surface coating zone 14. In this way, the third recycle mechanism 33 collects and recycles the whole amount of the air discharged from the individual setting zones and supplies it to the second base inner surface coating zone 12, the second base outer surface coating zone 13 and the second base (special) outer surface coating zone 14. The whole amount of air which is temporarily recycled within the second base outer surface coating zone 13 and the second base (special) outer surface coating zone 14 is discharged from these coating zones through the discharge mechanism 5 to the outside of the system.

The air supply mechanism 4 is connected to the supply duct of each setting zone, and is, as described above, also connected to the supply duct of the first base outer surface coating zone 11. In this way, the air-conditioned fresh air is supplied into each setting zone and the first base outer surface coating zone 11. The whole amount of air discharged from the individual setting zones is, as described above, recycled by the third recycle mechanism 33.

The air supply mechanism 4 is also connected to the supply ducts of the preheat zone 24 and the flush off zone 25. In this way, the air-conditioned fresh air is supplied into the preheat zone 24 and the flush off zone 25. The whole amount of air discharged from the preheat zone 24 and the flush off zone 25 is discharged through the discharge mechanism 5 to the outside of the system.

The coating facility 1 having the configuration described above is operated as follows.

The automobile body W on which electrodeposition coating is performed is first transported into the first base outer surface coating zone 11. The outer surface of the transported automobile body W is coated by the four wall-mounted coating robots 111 with the first base paint.

Then, the automobile body W is transported into the first setting zone 21. The transported automobile body W is transported along the transport line 2. The automobile body W is still placed on the transport carriage 113, and thus still placement time of the first base wet coating film formed in the first base outer surface zone 11 is acquired.

Then, the automobile body W is transported to the door coating zone 12A within the second base inner surface coating zone 12. First, for the transported automobile body W, with the four wall-mounted coating robots 121, the door corresponding to each of the coating robots 121 is opened by the coating robot 121 corresponding to the door, and in this state, the inner surface of the door is coated by the coating robot 121 with the second base paint. The door whose inner surface has been coated is closed by the coating robot 121.

Then, the automobile body W is transported to the bonnet tailgate coating zone 12B within the second base inner surface coating zone 12. Then, the opener robot 123 slides to a predetermined position according to the type of automobile of the automobile body W to open the bonnet hood, and in this state, the inner surface of the bonnet is coated by the two coating robots 122 with the second base paint.

Thereafter, the bonnet hood is closed by the opener robot 123, and the opener robot 123 slides to a predetermined position according to the type of automobile of the automobile body W to open the trunk hood, and in this state, the inner surface of the trunk is coated by the two coating robots 122 with the second base paint. Thereafter, the trunk hood is closed by the opener robot 123.

Then, the automobile body W is transported into the second base outer surface coating zone 13. The outer surface of the transported automobile body W is coated by the four wall-mounted coating robots 131 with the first base paint by wet-on-wet coating.

Then, the automobile body W is transported into the second setting zone 22. The transported automobile body W is still placed on the transport carriage 113, and thus still placement time of the second base wet coating film formed in the second base outer surface coating zone 13 is acquired.

Then, the automobile body W is transported into the second base (special) outer surface coating zone 14. The outer surface of the transported automobile body W is coated by the four wall-mounted coating robots 141 with the second base special paint by wet-on-wet coating.

Then, the automobile body W is transported into the third setting zone 23. The transported automobile body W is still placed on the transport carriage 113, and thus still placement time of the second base special wet coating film formed in the second base (special) outer surface coating zone 14 is acquired.

Then, the automobile body W is transported into the preheat zone 24 which adds preheat. Within the preheat zone 24, the wet coating film formed in each coating zone is preheated to a predetermined temperature.

Then, the automobile body W is transported into the flush off zone 25 where the automobile body W is dried with hot air which is adjusted to have a predetermined temperature and a predetermined quantity. In the transported automobile body W, most volatile components such as a solvent contained in the wet coating film are removed by the preheating in the preheat zone 24. Further, the smoothness thereof can be enhanced by the flush off zone 25.

Then, the automobile body W is transported to the door coating zone 15A within the clear inner surface coating zone 15. First, for the transported automobile body W, with the four wall-mounted coating robots 151, the door corresponding to each of the coating robots 151 is opened by the four coating robots 151 in the door coating zone 15A, and in this state, the inner surface of the door is coated by the coating robots 151 with the clear paint by wet-on-wet coating. The door whose inner edge has been coated with the clear paint is closed by the respective coating robot 151.

Then, the automobile body W is transported to the bonnet tailgate coating zone 15B within the clear inner surface coating zone 15. Then, the opener robot 153 slides to a predetermined position according to the type of automobile of the automobile body W to open the bonnet hood, and in this state, the inner surface of the bonnet is coated by one coating robot 152 with the clear paint by wet-on-wet coating.

Thereafter, the bonnet hood is closed by the opener robot 153, and then the opener robot 153 slides to a predetermined position according to the type of automobile of the automobile body W to open the trunk hood, and in this state, the inner surface of the trunk hood is coated by one coating robot 152 with the clear paint by wet-on-wet coating. Thereafter, the trunk hood is closed by the opener robot 153.

Then, the automobile body W is transported into the clear outer surface coating zone 16. The outer surface of the transported automobile body W is coated by the four wall-mounted coating robots 161 with the clear paint by wet-on-wet coating.

Then, the automobile body W is transported by the transport line 2 into the baking zone 26. Within the baking zone 26, the wet coating films formed in the individual coating zones are simultaneously baked and cured. In this way, 3C2B coating is performed.

In the present embodiment, the following effects are achieved.

In the coating facility 1 of the present embodiment, along the transport direction of the automobile body W, the first base outer surface coating zone 11, the second base inner surface coating zone 12, the second base outer surface coating zone 13, the clear inner surface coating zone 15, the clear outer surface coating zone 16 and the baking zone 26 are sequentially provided. In other words, instead of abolishing midcoat coating and baking after the midcoat coating, as the overcoat coating, the first base coating, the second base coating and the clear coating are performed by wet-on-wet coating, and the coating films are simultaneously baked and cured.

In the present embodiment, the overcoat base coating film is formed with two layers, that is, the first base coating film and the second base coating film, and a ray blocking function and a base hiding function included in the midcoat coating film are incorporated into the first base coating film, and thus it is possible to abolish the midcoat coating and the baking after the midcoat coating, with the result that it is possible to provide a 3C2B coating technology which can reduce the amount of $CO_2$ discharged and save energy.

In the present embodiment, the second base inner surface coating zone 12 is provided between the first base outer surface coating zone 11 and the second base outer surface coating zone 13, and thus it is possible to sufficiently acquire an interval from the first base outer surface coating to the second base outer surface coating. In this way, it is possible to sufficiently acquire still placement time of the first base wet coating film, and it is possible to apply the second base paint after the surface of the first base wet coating film is made to sufficiently flow and is smoothed. Hence, in the present embodiment, the surface of the coating film can be smoothed, and thus it is possible to obtain a satisfactory coating film appearance.

In the present embodiment, among the intervals between a plurality of coating zones, a setting zone is further provided in at least one or more of the intervals between the coating zones.

In the present embodiment, since the setting zone is provided in at least one or more of the intervals between the coating zones, it is possible to sufficiently acquire still placement time of the wet coating film, and it is possible to make the surface of the wet coating film more sufficiently flow. Hence, in the present embodiment, the surface of the coating film can be further smoothed, and thus it is possible to obtain a more satisfactory coating film appearance.

In the present embodiment, in the coating of the automobile body, the second base inner surface coating zone is formed with the door coating zone 15A and the bonnet tailgate coating zone 15B.

In this way, it is possible to acquire still placement time of the first base wet coating film for the second base outer surface coating by wet-on-wet coating.

In the present embodiment, the setting zone is a zone in which, as necessary, coating can be performed manually.

In the present embodiment, for example, even when a failure or the like occurs in a coating machine such as a coating robot provided within a coating zone and thus it is difficult to perform coating, in the setting zone provided on the downstream side, coating can be completed complementarily and manually. In other words, in the present embodiment, it is possible to acquire a space that copes with a failure in a coating machine, with the result that it is possible to perform more efficient coating.

In the present embodiment, fresh air is air-conditioned and is supplied into the setting zone, and the air-conditioned air discharged from each zone is recycled to the coating zone.

In the present embodiment, fresh air is air-conditioned and is supplied into the setting zone where coating is likely to be performed manually, and thus it is possible to enhance an operation environment. Since the fresh air whose temperature and humidity are appropriately adjusted is supplied, in the setting zone, a solvent in the wet coating film is volatilized efficiently, and the flow of the surface of the wet coating film can be facilitated. Hence, the surface of the coating film can be further smoothed, and thus it is possible to obtain a more satisfactory coating film appearance. Furthermore, since the air-conditioned air discharged from each zone is recycled, it is possible to reduce power necessary for air conditioning.

In the present embodiment, it is possible to provide a coating method which includes a first base outer surface coating step, a second base inner surface coating step, a second base outer surface coating step, a clear inner surface coating step, a clear outer surface coating step and a baking step. In other words, the first base outer surface coating step is performed in the first base outer surface coating zone 11, the second base inner surface coating step is performed in the second base inner surface coating zone 12, the second base outer surface coating step is performed in the second base outer surface coating zone, the clear inner surface coating step is performed in the clear inner surface coating zone 15, the clear outer surface coating step is performed in the clear outer surface coating zone 16 and the baking step is performed in the baking zone 26. Hence, in the coating method of the present embodiment, the same effects as in the coating facility 1 described above are obtained.

The present invention is not limited to the embodiment described above, and variations, modifications and the like which can achieve the object of the present invention are included in the present invention.

EXPLANATION OF REFERENCE NUMERALS

1: coating facility
3: recycle mechanism
4: air supply mechanism
11: first base outer surface coating zone
12: second base inner surface coating zone
13: second base outer surface coating zone
15: clear inner surface coating zone (clear coating zone)
15A: door coating zone
15B: bonnet tailgate coating zone (hood coating zone)
16: clear outer surface zone (clear coating zone)
26: baking zone
21: first setting zone (setting zone)
22: second setting zone (setting zone)
23: third setting zone (setting zone)
31: first self-recycle mechanism (recycle mechanism)
32: second self-recycle mechanism (recycle mechanism)
33: third recycle mechanism (recycle mechanism)
W: automobile body (coated product)

The invention claimed is:

1. A coating method of sequentially coating an automobile body in a plurality of coating steps while transporting the automobile body, the coating method comprising:
    a first base outer surface coating step of coating an outer surface of the automobile body on which electrodeposition coating is performed, with a first base paint which contains a resin component and a pigment component and in which a pigment concentration of a coating film after being baked and cured is 40 to 60 mass %, without performing midcoat coating;
    a second base inner surface coating step of coating an inner surface of the automobile body subjected to the first base outer surface coating step, with a second base paint which contains a resin component and a pigment component and in which a curing temperature is higher than a curing temperature of the first base paint;
    a second base outer surface coating step of coating, with the second base paint, by wet-on-wet coating, the outer surface of the automobile body subjected to the first base outer surface coating step;
    a clear coating step of coating, with a clear paint, by wet-on-wet coating, the automobile body subjected to the second base outer surface coating step; and
    a baking step of simultaneously baking and curing wet coating films formed with the first base paint and the second base paint in the automobile body subjected to the clear coating step,
    wherein the coating method is performed without using any other base paint than the first base paint and the second base paint.

2. The coating method according to claim 1, wherein the clear paint is lower, at the curing temperature of the second base paint, in a viscosity of the coating film than the second base paint.

* * * * *